United States Patent
Maruta et al.

[11] Patent Number: 5,863,630
[45] Date of Patent: Jan. 26, 1999

[54] SCREEN FOR A LARGE SIZE VIEW FIELD

[75] Inventors: Hajime Maruta; Masatoshi Niwa, both of Joetsu, Japan

[73] Assignee: Arisawa Mfg. Co., Ltd., Niigata-Ken, Japan

[21] Appl. No.: 754,836

[22] Filed: Nov. 22, 1996

[30] Foreign Application Priority Data

Feb. 6, 1996 [JP] Japan .................................. 8-019963
Jun. 11, 1996 [JP] Japan .................................. 8-149159

[51] Int. Cl.$^6$ ................................................. B32B 5/14
[52] U.S. Cl. ........................ 428/40.1; 359/443; 428/40.2; 428/41.1; 428/41.5; 428/314.4; 428/319.1; 428/319.7
[58] Field of Search .................. 428/40.1, 40.2, 428/41.1, 41.5, 314.4, 319.1, 319.7; 359/443

[56] References Cited

U.S. PATENT DOCUMENTS 3,467,569  9/1969  Weber .................................. 428/319.1
4,478,902 10/1984  Tsuzuku ................................ 428/174

FOREIGN PATENT DOCUMENTS

WO8101214  4/1981  WIPO .

*Primary Examiner*—Nasser Ahmad
*Attorney, Agent, or Firm*—Sughrue, Mion, Zinn, Macpeak & Seas, PLLC

[57] ABSTRACT

A screen for a large size view field is provided which is portable. The screen is formed by a plurality of screen members having a predetermined area and arranged up and down, right and left. A foamed film having bubbles therein is bonded to a back side surface of each screen member.

3 Claims, 2 Drawing Sheets

SCREEN FOR A LARGE SIZE VIEW FIELD

BACKGROUND OF THE PRESENT INVENTION

1. Field of the Invention

The present invention relates to a large size view field forming screen.

2. Description of the Related Art

Recently, in accordance with miniaturization of a full surface projection type projector, there is a demand for portable screens. To meet this demand, a technology has recently been proposed to form a large size view field screen by juxtaposing a plurality of screens each having a predetermined area, up and down and right and left. A technology has been proposed as a specific means in which a magnet is provided on a bottom surface of each screen which forms a large size screen (which will be referred to as a "prior" art screen). This is formed by suitably attaching each magnetic screen onto a magnetizable white board or the like. A large size screen having any desired size may be obtained on the white board or the like.

However, in the prior art, the magnet is attached to the screen. As a result, when the screen is transported together with magnetic cards or floppy discs, there is a problem that the magnets of the screen adversely affect the magnetic cards or the like.

SUMMARY OF THE INVENTION

In order to overcome the defects inherent in the prior art, an object of the present invention is to provide a novel screen structure for forming a large size view field.

In order to attain this and other objectives, according to the present invention, there is provided a large size view field forming screen in which a plurality of screen members having a predetermined area are arranged up and down, right and left, to form a large size view field, characterized in that a foamed film containing bubbles in its interior is bonded to a back side surface of each screen.

According to another aspect of the present invention, there is provided a large size view field forming screen in which a plurality of screen members having a predetermined area are arranged up and down, right and left, to form a large size view field. The large size view field is characterized in that a foamed film containing independent bubbles in its interior to exhibit an adhesive effect, and which is a peelable pressure-sensitive adhesive, is bonded to a back side surface of each screen.

In this case, the foamed film having the bubbles in its interior preferably comprises an acrylic polymer foam.

According to another aspect of the present invention, there is provided a large size view field forming screen, characterized in that an aluminum vaporized reflective material having an aluminum evaporated reflecting surface on its top surface, is laminated through an adhesive on a top surface of an acrylic polymer foam containing independent bubbles in its interior, to exhibit an adhesive effect, and which is a peelable pressure-sensitive adhesive; a deflecting film is laminated through an adhesive on a top surface of the reflective material; and a light diffusion film is laminated through an adhesive on a top surface of the deflecting film.

In this case, the aluminum vaporized reflecting material is obtained by forming an aluminum evaporated reflecting surface by evaporating aluminum on a polyethylene terephthalate film as the reflecting material, the deflecting film being made of polyethylene terephthalate film dye is used as the deflecting film, a biaxial drawn polypropylene film whose surface is mat-worked is used as the light diffusion film, and a urethane type adhesive is used as the adhesive.

The film to be bonded on the back side surface of the screen according to the present invention is the foamed film having bubbles therein. The adhesive effect is exhibited by the foamed film (suction effect). Also, since the present invention utilizes the adhesive effect of the foamed film having the bubbles therein, it is possible to bond the screen to any surface if it is smooth on the top surface. This contributes to an excellent practical use.

DESCRIPTION OF THE PREFERRED EMBODIMENTS

One embodiment of the invention will now be described with reference to the accompanying drawings.

Figure 1:
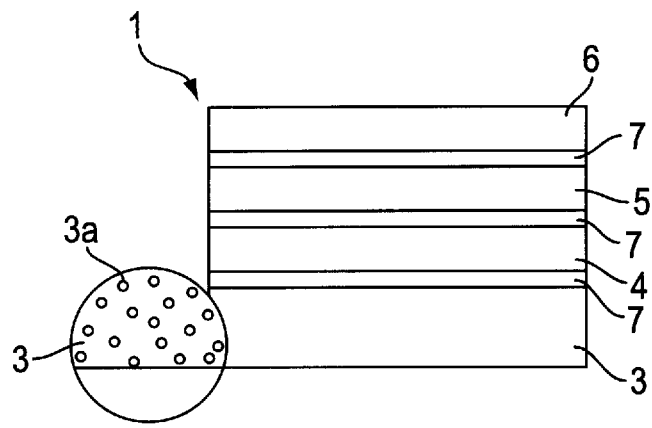
FIG. 1 is a view showing a structure of a screen according to one embodiment of the invention.
Figure 2:
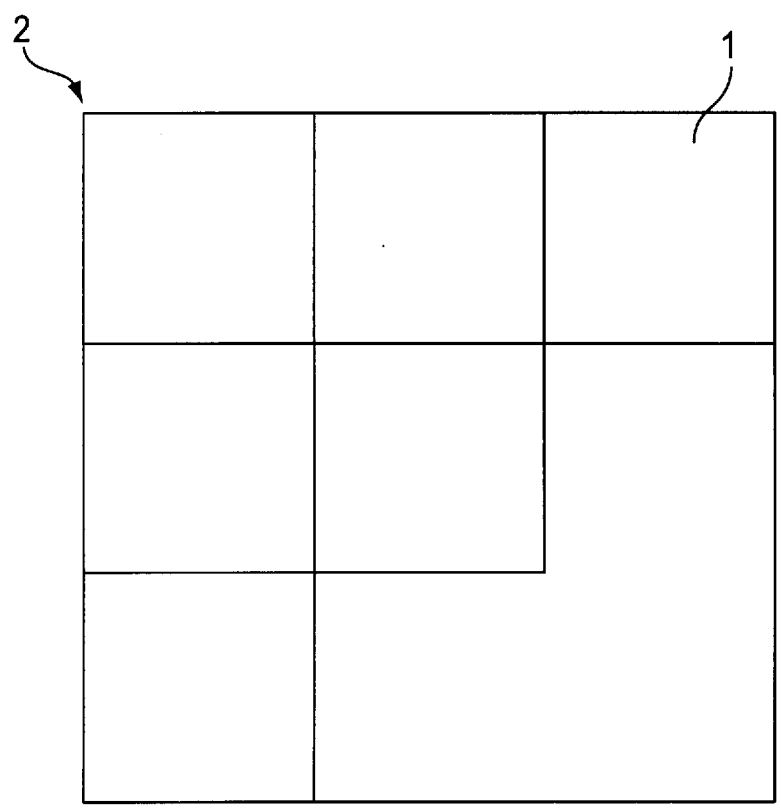
FIG. 2 is a frontal view showing a state in which the screen members are arranged or juxtaposed.

FIG. 1 is a view showing a structure of a screen 1. Any desired number of the screens 1 are juxtaposed right and left and up and down, to form a large size screen 2 as shown in FIG. 2. Thus, an image is formed from a projector (not shown) onto the large size screen 2.

The structure of the screen 1 will be described in detail. A reflecting member 4 (i.e., PET film) having an upper surface formed into an aluminum deposited reflecting surface, is laminated on a top surface of a foamed film 3, which is a pressure-sensitive adhesive that may be peeled and exhibits an adhesive effect since it has independent foams or bubbles 3a in its interior. A deflecting film 5 (which is a PET dye type) is laminated on the top surface of this reflecting member 4. A light diffusion film 6 (OPP mat film) whose top surface has been subjected to a mat machining treatment is laminated on the top surface of the deflecting film 5. Reference numeral 7 denotes a urethane type adhesive.

The foamed film 3 which is the pressure-sensitive adhesive and which is peelable and exhibits adhesive effect since it has in its interior the independent foam 3a, is preferably an acrylic polymer foam (foaming magnification of 1.5 times) used in a cellopy No. 555A made by Taisei Laminator K. K. This acrylic polymer foam has a characteristic that after the adhesion, the adhering bubbles are stable and the adhesive effect is increased in accordance with a lapse of time. Directly, after the initial adherence to a glass, the adhesion strength is 0.15 Kg, 24 hours after the initial adherence the adhesion strength is 0.30 kg. The acrylic polymer foam is characterized by an elongation of 400% and a breaking strength of 1000 g/cm$^2$. The adhesion print is not left on the surface when the polymer foam is peeled away. Any kind of material may be used instead for the acrylic polymer if that material exhibits the same adhesive effect.

Figure 3A:
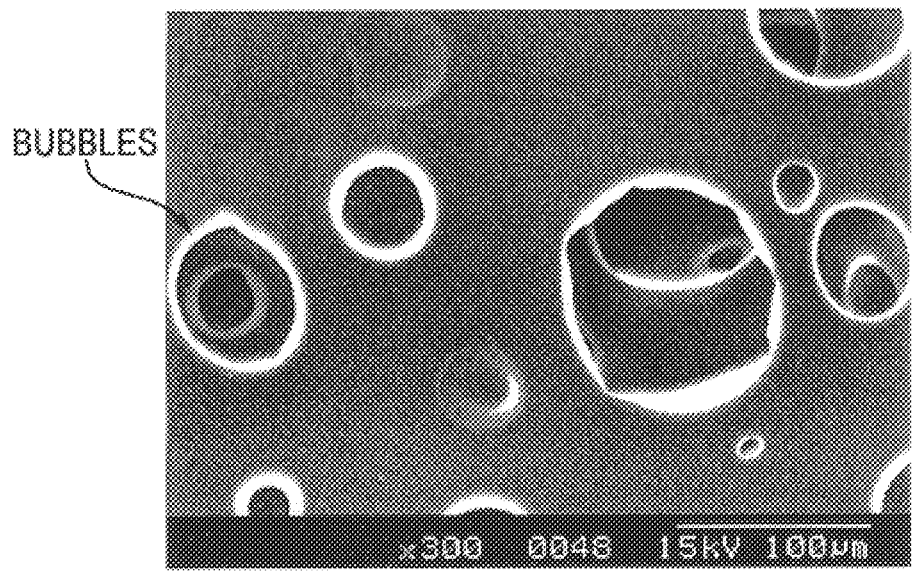
FIGS. 3A and 3B are views representing stages as viewed through an electronic microscope showing an acrylic polymer foam according to the embodiment of the invention.
Figure 3B:
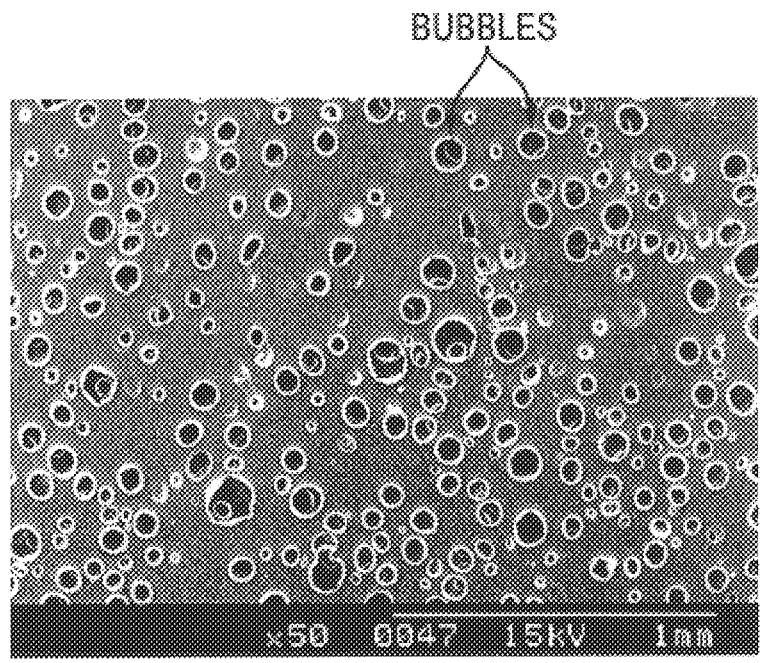

Incidentally, FIGS. 3-(A) and 3-(B) are views of copies of electron microscope pictures of the acrylic polymer foam according to the embodiment of the present invention. FIG. 3A shows the picture at 300 times and FIG. 3B shows the picture at 50 times.

As described above, in the embodiment of the present invention, the adhesive effect is exhibited by the bubbles 3*a* contained in the foamed film 3, and a suitable number of the screens 1 are arranged up and down, right and left, on a desired surface having a smooth top surface so that a large size screen 2 may readily be formed.

This screen 1 does not use any magnet as described in the background of the present invention. Accordingly, there is no problem even if the user also carries magnetic cards or the like with him.

Also, the acrylic polymer foam made by Taisei Laminator K. K. is very light in weight in comparison with the magnet. The screen 1 is therefore light in weight. Also, the acrylic polymer foam may be water-washable. This contributes to the excellent practical use.

Incidentally, the screen 1 is a deflector screen in the embodiment. However, the present invention is not limited thereto or thereby. It is applicable to any type of screen such as a regular white mat screen, a beads type screen and the like.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

What is claimed is:

1. A large size view field forming projection screen, comprising:

an aluminum vaporized reflective material having an aluminum evaporated reflecting surface on its top surface, the reflective material being laminated through an adhesive on a top surface of an acrylic polymer foam containing independent bubbles in its interior to exhibit an adhesive effect, said acrylic polymer foam being a peelable pressure-sensitive adhesive;

a deflecting film laminated through an adhesive on a top surface of the reflective material; and a light diffusion film laminated through an adhesive on a top surface of the deflecting film.

2. The large size view field forming projection screen according to claim 1, wherein the aluminum vaporized reflecting material has an aluminum evaporated reflecting surface formed by evaporated aluminum on a polyethylene terephthalate film;

wherein the deflecting film comprises a polyethylene terephthalate film dye;

wherein the light diffusion film comprises a biaxial drawn polypropylene film formed with a matte finish; and wherein the adhesive comprises a urethane adhesive.

3. A large size view field forming projection screen comprising a plurality of screen members, each of said plurality of screen members comprising:

a foamed film;

an aluminum vaporized reflective material having an aluminum evaporated reflecting surface on its top surface, said reflective material being laminated through an adhesive on a top surface of said foamed film;

a deflecting film laminated through an adhesive on a top surface of said reflective material; and a light diffusion film laminated through an adhesive on a top surface of said deflecting film.

* * * * *